United States Patent
Eustice

(10) Patent No.: US 6,810,683 B2
(45) Date of Patent: Nov. 2, 2004

(54) THERMOSTATIC EXPANSION VALVE EXIT FLOW SILENCER DEVICE

(75) Inventor: Harry E. Eustice, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/364,203

(22) Filed: Feb. 11, 2003

(65) Prior Publication Data
US 2004/0154323 A1 Aug. 12, 2004

(51) Int. Cl.[7] ............................................. F25D 19/00
(52) U.S. Cl. .......................... 62/296; 138/41; 138/44; 181/295
(58) Field of Search .................... 62/222, 296, 511, 62/527; 138/41, 44; 181/231, 232, 254, 284, 294, 295

(56) References Cited

U.S. PATENT DOCUMENTS

| 3,984,224 A | | 10/1976 | Dawkins .................... 62/89 |
| 4,192,402 A | * | 3/1980 | Nakagawa et al. ......... 181/256 |
| 4,357,988 A | | 11/1982 | Hudson et al. ............. 165/26 |
| 4,914,929 A | * | 4/1990 | Shimazaki .................. 62/515 |
| 5,473,124 A | * | 12/1995 | Yazici et al. ............... 181/224 |
| 5,689,964 A | * | 11/1997 | Kawakita et al. .......... 62/151 |
| 5,906,225 A | * | 5/1999 | Stark et al. ................ 138/41 |
| 5,927,089 A | * | 7/1999 | O'Donnell ................ 62/228.4 |
| 6,148,631 A | * | 11/2000 | Watanabe et al. ........... 62/296 |
| 6,427,465 B1 | | 8/2002 | Bednarchik et al. ........ 62/227 |
| 6,568,198 B1 | * | 5/2003 | Tadano et al. .............. 62/217 |
| 2003/0038136 A1 | * | 2/2003 | Bauer ........................ 220/563 |

FOREIGN PATENT DOCUMENTS

| JP | 409133434 A | * | 5/1997 |
| SU | 1127983 A | * | 12/1983 |

* cited by examiner

Primary Examiner—William E. Tapolcai
Assistant Examiner—Mohammad M. Ali
(74) Attorney, Agent, or Firm—Laura C. Hargitt

(57) ABSTRACT

An apparatus for manipulating the air temperature within an interior compartment of a vehicle includes a compressor, a condenser, and an evaporator interconnected in a manner to remove heat from air in the interior compartment. A thermostatic expansion valve is connected between the condenser and evaporator, and includes an inlet and an outlet. A silencer screen is positioned at the outlet of the thermostatic expansion valve to reduce turbulence in refrigerant flow exiting the thermostatic expansion valve.

16 Claims, 3 Drawing Sheets

THERMOSTATIC EXPANSION VALVE EXIT FLOW SILENCER DEVICE

TECHNICAL FIELD

The present invention relates to an exit flow silencer device for reducing turbulence in refrigerant flowing through a thermostatic expansion valve in an air conditioning system, such as in a vehicle.

BACKGROUND OF THE INVENTION

Vehicle air conditioning systems typically include a compressor, condenser, and evaporator interconnected in a manner to remove heat from air in the interior compartment of the vehicle. Some vehicle air conditioning systems include a thermostatic expansion valve connected between the evaporator and condenser to reduce pressure and control flow of refrigerant flowing to the evaporator. By dropping pressure of refrigerant entering the evaporator, this enables the refrigerant to start boiling off or evaporate so that heat absorption can begin.

The thermostatic expansion valve has a capillary sensor that monitors refrigerant temperature flowing out of the evaporator. Expansion valves are described and calibrated to specific super heating settings. The purpose of the sensor and super heating setting is to allow the evaporator to get as cold as possible without freezing up and to assure that all liquid refrigerant entering the evaporator is a vapor when it exits.

Most automotive air conditioning compressors cannot accept liquid refrigerant because liquids cannot be compressed. Most systems with expansion valves will also have a thermostat control that assists in keeping the evaporator from icing up. The thermostat cycles the compressor when the evaporator approaches freezing, which is about the same time an expansion valve would start reducing flow of refrigerant. In combination, the expansion valve and the thermostat keep the evaporator as close to freezing as possible for maximum heat absorption. The expansion valve is designed to only regulate a solid liquid flow. Hissing sounds coming from the expansion valve indicate vapor bubbles passing through, which is normally the result of poor sub-cooling, a low charge or restriction in the high side. This also means the evaporator will not reach its optimum low temperature.

Most noise associated with the expansion valve occurs when sub-cooling is lost in the condenser. This may occur at vehicle idle or at low front end air flow and low compressor speed, which is run by the engine. In a vehicle having a rear air conditioning system, the thermostatic expansion valve in the rear part of the system experiences lower sub-cooling than the front because it is further from the condenser, and there are restrictions in the line.

It is desirable to provide an improved air conditioning system wherein noise from the thermostatic expansion valve is abated.

SUMMARY OF THE INVENTION

The invention provides a silencer screen positioned at the outlet of the thermostatic expansion valve to reduce turbulence in refrigerant flow exiting the thermostatic expansion valve.

More specifically, the invention provides an apparatus for manipulating the air temperature within an interior compartment of a vehicle. The apparatus includes a compressor, a condenser, and an evaporator interconnected in a manner to remove heat from air in the interior compartment. A thermostatic expansion valve is connected between the condenser and evaporator. The thermostatic expansion valve has an inlet and an outlet. A silencer screen is positioned at the outlet of the thermostatic expansion valve to reduce turbulence in refrigerant flow exiting the thermostatic expansion valve.

Preferably, the silencer screen is cylindrical in shape and supported by a cylindrical cage structure. Other shapes are contemplated within the scope of the present invention. The silencer screen is positioned within an end of an evaporator inlet tube which is connected to the thermostatic expansion valve.

The cylindrical cage structure preferably has a closed end and includes a flange which is connected to the outlet of the thermostatic expansion valve. The silencer screen is a mesh configuration having an opening size range between approximately 10 and 500 microns with 25% to 90% open flow area within the mesh configuration.

The silencer screen may be metal or plastic. The silencer screen may be connected to the cage structure, for example, by a plastic injection over-mold process.

The silencer screen is most preferably attached to an outlet of the thermostatic expansion valve adjacent a rear evaporator in a vehicle air conditioning system which includes front and rear evaporators.

The above objects, features, advantages, and other object, features and advantages of the present invention are readily apparent from the following detailed description of the best modes for carrying out the invention when taken in connection with the accompanying drawings.

DESCRIPTION OF THE PREFERRED EMBODIMENTS

Figure 1:
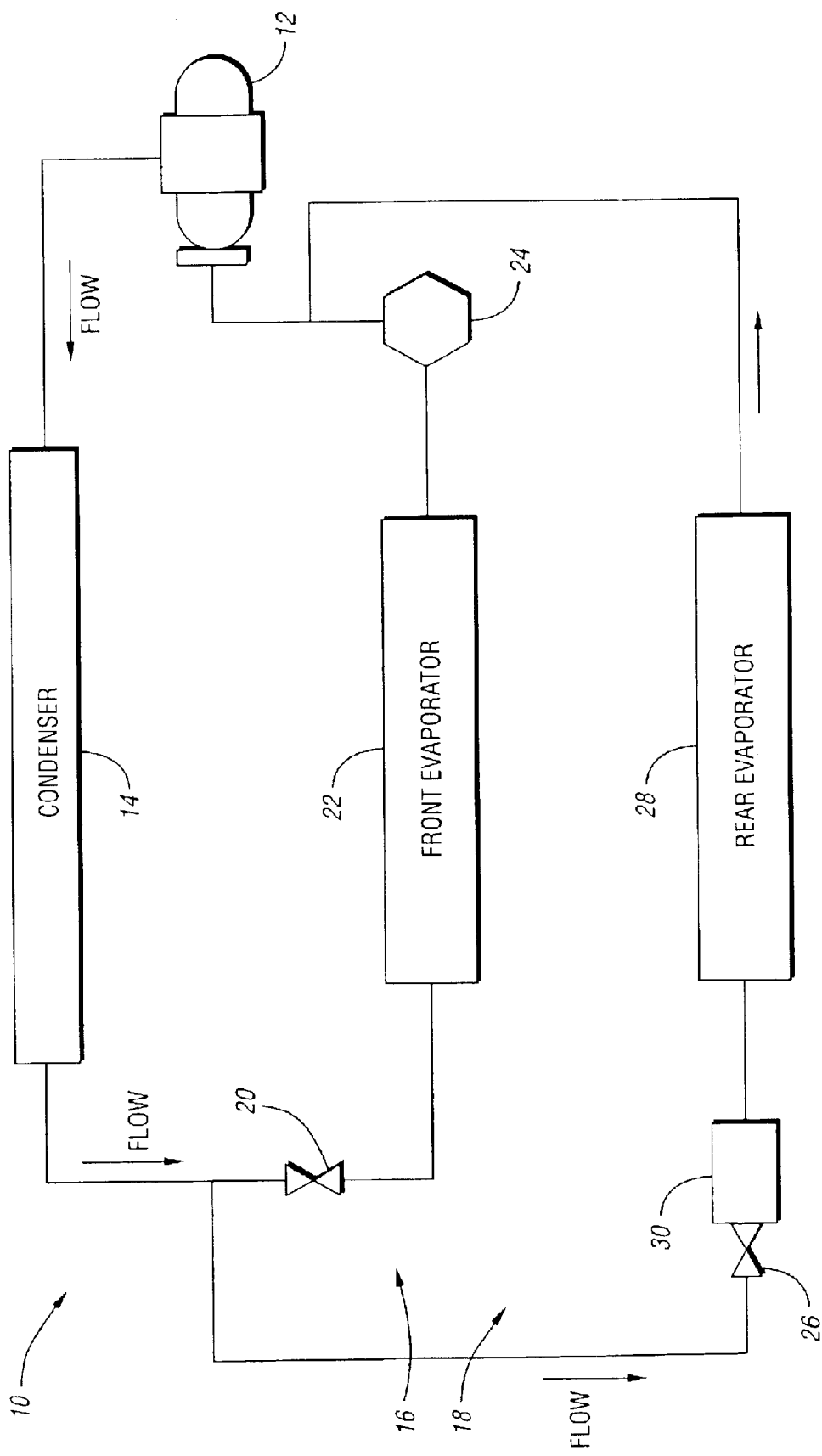
FIG. 1 shows a schematic flow diagram illustrating an air conditioning system for a vehicle in accordance with the invention.

FIG. 1 shows a schematic illustration of an air conditioning system 10 for use in a vehicle. As shown, the air conditioning system 10 includes a compressor 12 which pumps refrigerant through the system. Super heated vapor refrigerant exits the compressor 12 at high pressure and enters the condenser 14, which exchanges heat to the ambient and condenses the vapor to a sub-cooled liquid at high pressure.

As shown, the air conditioning system 10 includes a front portion 16 and a rear portion 18. The front portion 16 includes a front thermostatic expansion valve (or orifice tube) 20 which provides a restriction that changes the pressure from high to low and changes the flow to a two-phase refrigerant at low pressure. The two-phase refrigerant enters the front evaporator 22. The evaporator 22 draws heat from the evaporator fins into the refrigerant. As the refrigerant changes states (i.e. evaporates from two-phase to just vapor), it expands and absorbs heat. The super heated vapor exits the front evaporator 22 at low pressure and enters the accumulator 24.

The rear portion 18 of the air conditioning system 10 is positioned in parallel with the front thermostatic expansion valve 20, front evaporator 22, and accumulator 24. The rear portion 18 includes the rear thermostatic expansion valve 26 and the rear evaporator 28. A refrigerant flow silencer device 30 is positioned at the outlet of the rear thermostatic expansion device 26. Similar to the front portion 16, in the rear portion 18, a two-phase refrigerant at low pressure exits the silencer device 30 and enters the rear evaporator 28. A super heated vapor at low pressure exits the rear evaporator 28 and enters the compressor 12.

The rear thermostatic expansion valve 26 includes a variable restriction or orifice which is controlled based upon the characteristics of heat exchange in the rear evaporator 28. The temperature at the evaporator outlet is measured and flow to the evaporator is optimized by the rear thermostatic expansion valve 26 to provide optimal flow through the rear evaporator 28. The rear thermostatic expansion valve 26 is used with the rear evaporator 28 because it helps balance refrigerant flow between the front and rear portions 16, 18 of the air conditioning system 10.

Figure 2:
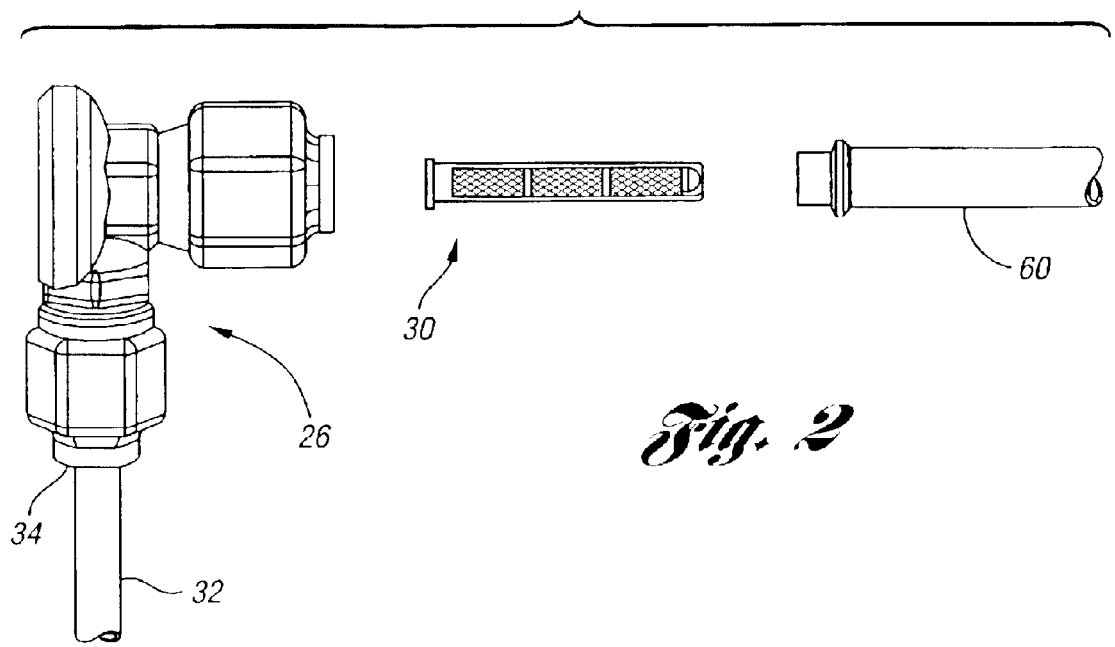
FIG. 2 shows a partially exploded side view of a thermostatic expansion valve, silencer screen, and evaporator inlet tube for use with the embodiment of FIG. 1.
Figure 3:
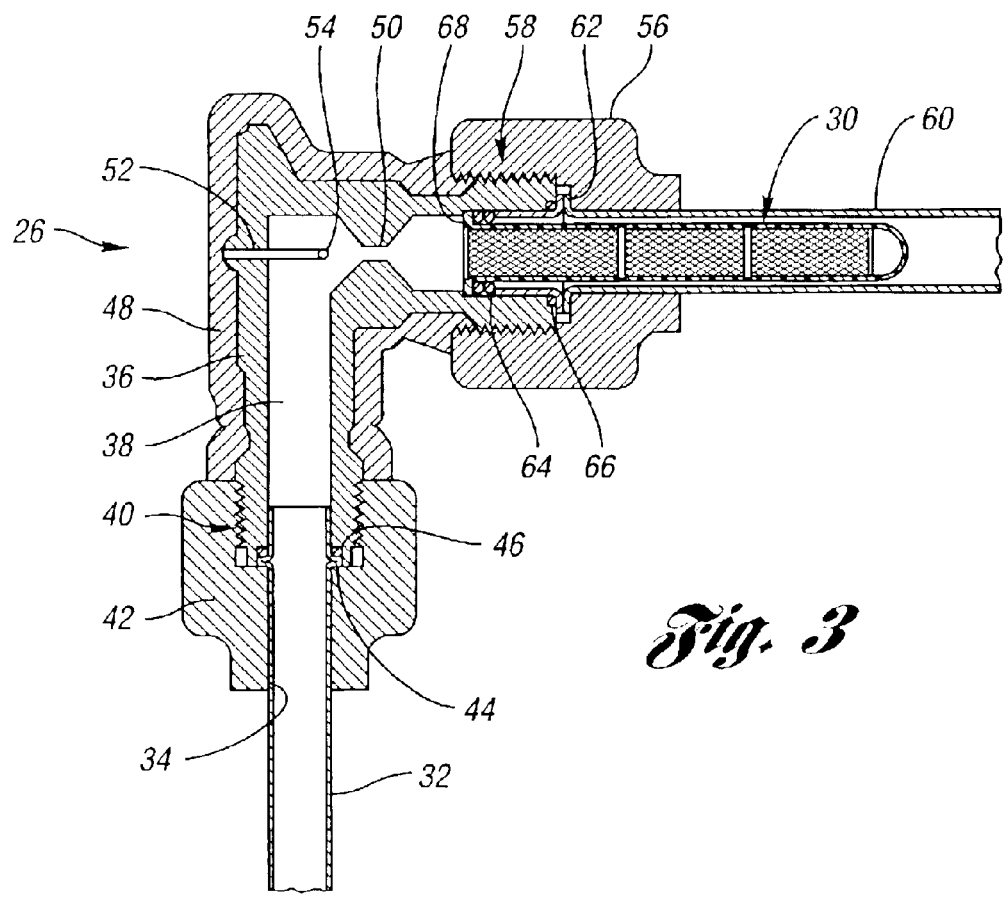
FIG. 3 shows a vertical cross-sectional view of an assembly of the components shown in FIG. 2.

The rear thermostatic expansion valve 26 and silencer device 30 are shown in greater detail in FIGS. 2 and 3. As shown in FIGS. 2 and 3, a thermostatic expansion valve inlet tube 32 is connected to an inlet 34 of the rear thermostatic expansion valve 26. A body 36 of the thermostatic expansion valve 26 forms a channel 38 to carry the refrigerant. The body 36 includes a threaded portion 40 which is threadedly engaged with the nut 42. The nut 42 engages a crimped portion 44 of the inlet tube 32 to secure the inlet tube 32 to the expansion valve 26. An O-ring seal 46 is also provided between the crimped portion 44 of the tube 32 and the body 36.

The body 36 is enclosed by a housing 48. The body 36 forms a variable orifice 50 which is adjustable via the pin 52. The pin 52 includes a sphere 54 at its distal end which is adjustable with respect to the orifice 50 for varying flow through the orifice 50.

At the outlet of the body 36, a second nut 56 is engaged with the threads 58 of the body 36. The nut 56 is operative to connect the evaporator inlet tube 60 by engaging the crimped portion 62 of the evaporator inlet tube 60. O-ring seals 64, 66 are provided between the silencer device 30 and the body 36. The flange 68 of the silencer device 30 is sufficiently large so that it may not enter the evaporator inlet tube 60. Accordingly, the silencer device 30 is held in position by the nut 56, housing 48, and evaporator inlet tube 60 via the flange 68.

Figure 4:
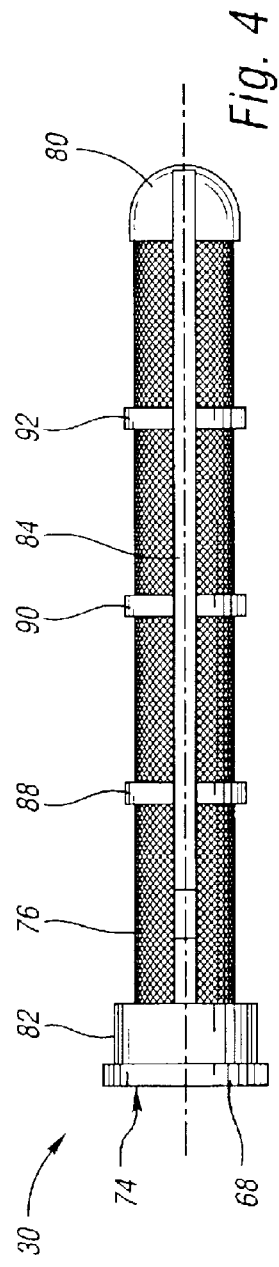
FIG. 4 shows a side-view of a silencer screen and cage assembly in accordance with the invention.
Figure 5:
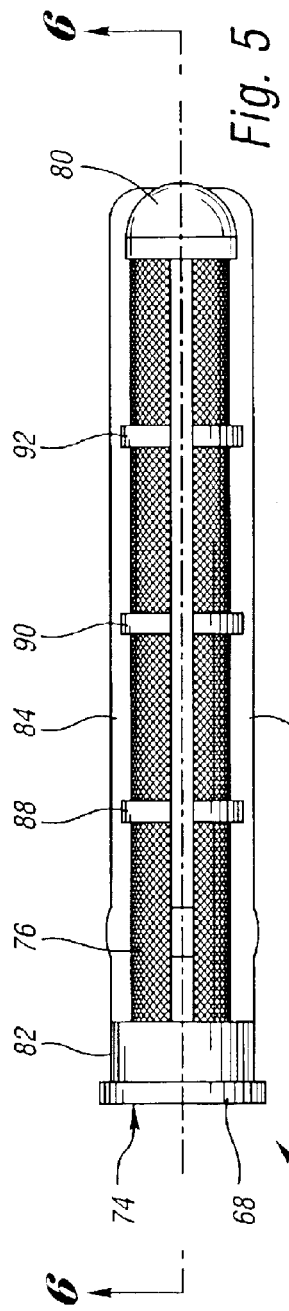
FIG. 5 shows a top view of the silencer screen and cage assembly of FIG. 4.
Figure 6:
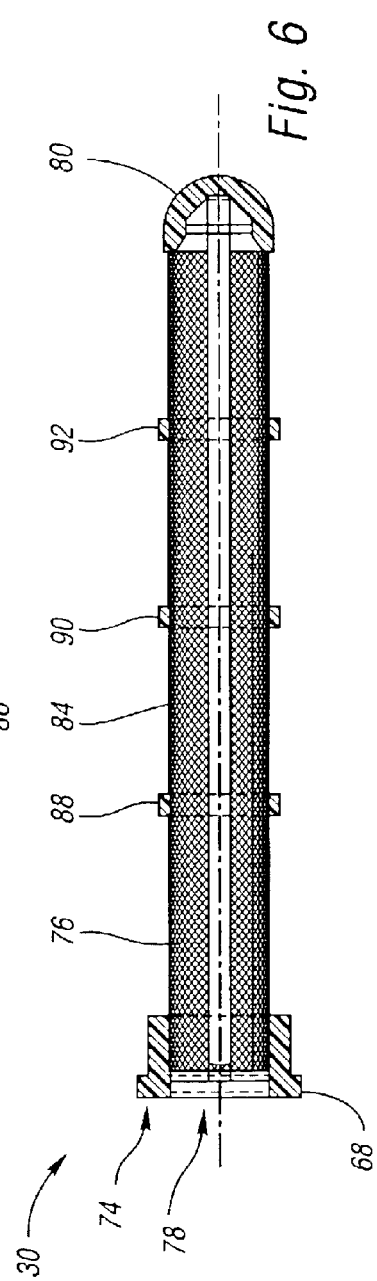
FIG. 6 shows a longitudinal cross-sectional view taken at line 6-6 of FIG. 5.

The silencer device 30 is shown in greater detail in FIGS. 4–6. As shown, the silencer device 30 includes a generally cylindrical cage structure 74 which supports a cylindrical silencer screen 76. The silencer screen is formed in a cylindrical shape (i.e. it is round in vertical cross-section to fit in the tube 60) and is supported by the cage structure 74. As shown, the cage structure 74 includes an open inlet 78 through which refrigerant flow may enter, and a closed end 80 which causes the refrigerant to flow radially outward through the screen 76 in order to reduce turbulence. The cage structure 74 includes a base 82 which is connected to the flange 68. A pair of ribs 84, 86 extend longitudinally from the base 82 along the length of the silencer device 30 to the closed end 80. Screen support members 88, 90, 92 extend from the ribs 84 to support the screen 76.

The screen 76 is preferably a nylon plastic material which is connected to the cage structure 74 in a plastic injection over-molding process, wherein the screen is inserted into a mold and secured in place, and molten plastic is injected into the mold and bonds with the screen as the cage structure is formed.

Alternatively, the screen 76 could be a metal screen. The screen may be configured in a variety of shapes, such as: a cylindrical shape with a closed exit end; a cylindrical shape with an open exit end; a cone shape; a disk shape; a flat shape; a dome shape; etc.

Preferably, the silencer screen is in a mesh configuration having an opening size range between approximately 10 and 500 microns with 25% to 90% open area. The screen may be held in place by a plastic injection over-molding process, a plastic holder, a metal holder, etc. The silencer device may be held in place within the evaporator inlet tube by a metal detainer, plastic detainer, adhesive, or it may be screwed or pressed in closely adjacent the thermostatic expansion valve.

Accordingly, the silencer device dampens the turbulent two-phase refrigerant flow impact and high-flow velocity noise characteristics as the flow exits the thermostatic expansion valve and enters the evaporator, thus attenuating refrigerant noise. The device is particularly useful when the incoming thermostatic expansion valve refrigerant quality is low (less sub-cooled) and when the exiting refrigerant flow contains more vapor and is therefore more likely to generate objectionable refrigerant noise (hissing).

Alternatively, the silencer screen may be positioned inside the thermostatic expansion valve, as opposed to being positioned in the evaporator inlet tube.

While the best modes for carrying out the invention have been described in detail, those familiar with the art to which this invention relates will recognize various alternative designs and embodiments for practicing the invention within the scope of the appended claims.

What is claimed is:

1. An apparatus for manipulating the air temperature within an interior compartment of a vehicle, the apparatus comprising:
   a compressor, a condenser and an evaporator interconnected in a manner to remove heat from air in the interior compartment;
   a thermostatic expansion valve connected between the condenser and evaporator, said thermostatic expansion valve including a body having an inlet and an outlet and a nut engageable with said outlet; and
   a silencer screen positioned at the outlet of the thermostatic expansion valve body to reduce turbulence in refrigerant flow exiting the thermostatic expansion valve; and wherein the silencer screen is positioned within a crimped portion of an evaporator inlet tube which is connected to the thermostatic expansion valve body when the nut is engaged with said outlet against said crimped portion; and wherein the silencer screen is supported by a cage structure including a flange which is sufficiently large so that it may not enter the evaporator inlet tube and is connected to the outlet of the thermostatic expansion valve body and hold in position by the nut, body and crimped portion.

2. The apparatus of claim 1, wherein the silencer screen is cylindrical in shape and said cage structure is cylindrical.

3. The apparatus of claim 2, wherein the cylindrical cage structure has a closed end.

4. The apparatus of claim 1, wherein the silencer screen is a mesh configuration having an opening size range between approximately 10 and 500 microns with 25% to 90% open flow area within the mesh configuration.

5. The apparatus of claim 4, wherein the silencer screen is metal.

6. The apparatus of claim 4, wherein the silencer screen is plastic.

7. The apparatus of claim 2, wherein the silencer screen is connected to the cage structure by a plastic injection over mold process.

8. The apparatus of claim 1, wherein the apparatus includes front and rear evaporators, and the silencer screen is connected adjacent the rear evaporator.

9. A thermostatic expansion valve assembly for use in an air-conditioning system, the assembly comprising:
- a thermostatic expansion valve having a variable orifice configured to reduce pressure and regulate flow of refrigerant passing through the thermostatic expansion valve, said thermostatic expansion valve including a body having an inlet and an outlet and a fastener engageable with said outlet; and
- a silencer screen positioned at the outlet of the thermostatic expansion valve body to reduce turbulence in refrigerant flow exiting the thermostatic expansion valve; and wherein the silencer screen is configured to be positioned within a crimped portion of an evaporator inlet tube which is connectable to the thermostatic expansion valve body when the fastener is engaged with said outlet at said crimped portion; and wherein the silencer screen is supported by a cage structure including a flange which is sufficiently large so that it may not enter the evaporator inlet tube and is configured to be connectable to the outlet of the thermostatic expansion valve body so that the silencer screen is held in position by the fastener, body and crimped portion via the flange.

10. The thermostatic expansion valve assembly of claim 9, wherein the silencer screen is cylindrical in shape and said cage structure is cylindrical.

11. The thermostatic expansion valve assembly of claim 10, wherein the cylindrical cage structure has a closed end.

12. The thermostatic expansion valve assembly of claim 9, wherein the silencer screen is a mesh configuration having an opening size range between approximately 10 and 500 microns with 25% to 90% open flow area within the mesh configuration.

13. The thermostatic expansion valve assembly of claim 12, wherein the silencer screen is metal.

14. The thermostatic expansion valve assembly of claim 12, wherein the silencer screen is plastic.

15. The thermostatic expansion valve assembly of claim 10, wherein the silencer screen is connected to the cage structure by a plastic injection over mold process.

16. An apparatus for manipulating the air temperature within an interior compartment of a vehicle, the apparatus comprising:
- a compressor, a condenser, a front thermostatic expansion valve, a front evaporator, an accumulator, and a rear thermostatic expansion valve and a rear evaporator connected in parallel with the front thermostatic expansion valve and the front evaporator;
- said rear thermostatic expansion valve having an inlet and an outlet;
- a rear evaporator inlet tube connected between the rear evaporator and the rear thermostatic expansion valve; and
- a silencer screen configured to be positioned in a crimped portion of the rear evaporator inlet tube at the outlet of the thermostatic expansion valve to reduce turbulence in refrigerant flow exiting the thermostatic expansion valve;
- said silencer screen being cylindrical in shape, supported by a cylindrical cage structure having a closed end and having a flange operable in cooperation with the crimped portion of the rear evaporator inlet tube to hold the silencer screen in position on the outlet of the rear thermostatic expansion valve.

* * * * *